(12) United States Patent
Montero et al.

(10) Patent No.: US 7,536,569 B2
(45) Date of Patent: May 19, 2009

(54) SYSTEM AND METHOD FOR MANAGING POWER PROVIDED TO A PORTABLE INFORMATION HANDLING SYSTEM

(75) Inventors: Adolfo S. Montero, Austin, TX (US);
Joey M. Goodroe, Austin, TX (US);
Merle Wood, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 466 days.

(21) Appl. No.: 11/409,775

(22) Filed: Apr. 24, 2006

(65) Prior Publication Data

US 2007/0250722 A1    Oct. 25, 2007

(51) Int. Cl.
*G06F 1/00*    (2006.01)
*H02H 3/20*    (2006.01)

(52) U.S. Cl. .......................... 713/300; 713/310; 361/90
(58) Field of Classification Search ................... 713/300
See application file for complete search history.

(56) References Cited

U.S. PATENT DOCUMENTS

| | | | |
|---|---|---|---|
| 7,002,265 B2 | 2/2006 | Potega | 307/149 |
| 7,065,659 B2 | 6/2006 | Malueg et al. | 713/300 |
| 7,082,543 B2 | 7/2006 | Lin | 713/320 |
| 2004/0018774 A1* | 1/2004 | Long et al. | 439/620 |
| 2006/0103996 A1* | 5/2006 | Carroll et al. | 361/90 |
| 2007/0234087 A1* | 10/2007 | Cromer et al. | 713/310 |
| 2008/0191550 A1* | 8/2008 | Parnis | 307/9.1 |

\* cited by examiner

*Primary Examiner*—Suresh K Suryawanshi
(74) *Attorney, Agent, or Firm*—Robert W. Holland; Hamilton & Terrile, LLP

(57) ABSTRACT

A portable information handling system having internal battery power and external adapter power manages power drawn from the external power adapter to avoid exceeding the power rating of the external power adapter. As power drawn from the external adapter approaches a predetermined limit of the power adapter power rating, a power manager of the information handling system alters the operation of the information handling system to reduce power drawn from the adapter, such as by reducing current drawn to charge the battery, enforcing battery optimized mode steps or throttling central processing unit operation. Incremental decreases in power consumption maintain power draw below the external adapter power rating while incremental increases in power consumption have a delay that returns the information handling system to normal operations without excessive oscillation between operating modes.

19 Claims, 3 Drawing Sheets

SYSTEM AND METHOD FOR MANAGING POWER PROVIDED TO A PORTABLE INFORMATION HANDLING SYSTEM

BACKGROUND OF THE INVENTION

1. Field of the Invention

The present invention relates in general to the field of information handling system power supply, and more particularly to a system and method for managing power provided to a portable information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have, in particular, grown considerably popular with end users in recent years. Portable information handling systems have internal batteries to power the system without a need for an external power source, such as an AC outlet. An internal battery provides end users with greater flexibility by allowing free movement with the system while the system is running. One concern in the design and use of portable information handling systems is the availability of sufficient battery life in the system to provide a reasonable operating time before the battery charge expires and a recharge is needed. In order to enhance battery life, portable information handling systems are typically built with power efficient components and typically include power management systems that throttle or idle processing components when on battery power. Generally, power management systems do not have to reduce component power consumption when the portable information handling system is plugged into an external power source. Power provided from the external power source is directed primarily to run the components operating on the information handling system with any extra power diverted to charge the battery.

As processing components have become more powerful over time, the power consumed by them has tended to increase. One difficulty that has arisen due to this increased power consumption is that peak power consumption levels for an information handling system can exceed the power rating of the adapter that provides external power to the system. Adapters typically have a crow-bar safety system that will trip if power drawn from the adapter exceeds the adapter power rating. Generally, adapters are built with an operating margin that allows them to run at slightly greater than the power rating for extended periods of time without tripping the crow-bar circuitry. This, however, presents a difficulty since UL specifications require that an information handling system average input current not exceed the adapter's current rating. With higher performing processor and graphics solutions as well as an increasing number of features, a maximally-configured system operating at peak power consumption can draw power at a rate that exceeds the UL specification for the adapter with or without tripping the crow-bar circuitry. Systems are not allowed to ship if a violation of the UL specification occurs. The risk of such a violation is enhanced when tolerances relating to power management and measurements stackup to reduce the effective output of the power adapter.

SUMMARY OF THE INVENTION

Therefore a need has arisen for a system and method which manages power drawn by a portable information handling system from a power adapter.

In accordance with the present invention, a system and method are provided which substantially reduce the disadvantages and problems associated with previous methods and systems for managing power provided to portable information handling systems. A power manager running on the information handling system alters the operation of the components on the information handling system to maintain power drawn by the information handling system from the external power adapter below a power rating of the external adapter.

More specifically, the power manager senses current provided by the external adapter and compares the sensed current with a maximum current associated with the power rating of the power adapter. If the sensed current falls within a predetermined limit of the maximum current, a battery charge module incrementally steps current provided to a battery of the information handling system to a minimal amount, and then the power manager alters the operation of processing components of the information handling system to reduce their power draw. For instance, a battery optimized mode module incrementally steps through battery optimized modes to reduce power consumption. After the battery optimized mode module steps to a battery optimized mode with minimal power draw, a central processing unit throttle module steps through central processing unit throttling modes to further reduce power draw. If the sensed current falls out of the predetermined limit of the maximum current, the power manager incrementally alters the operation of the information handling system to allow increased power draw from the external power adapter, such as by increasing the central processing unit operating speed, increasing the battery optimized mode power draw and increasing charge allowed to the battery. The incremental increases in power draw have a predetermined delay between each incremental increase to reduce oscillations between operating states of the information handling system processing components.

The present invention provides a number of important technical advantages. One example of an important technical advantage is that power drawn by a portable information handling system from a power adapter is managed at or below a power rating of the adapter. The power management system reduces power consumption incrementally as the power rating of the adapter is approached to minimize the impact on the end user of the system. Incremental application of the battery optimized mode reduces power drawn by the information handling system with an operating mode normal to the end user. Further reduction of power drawn by CPU throttling ensures that the power rating of the adapter will not be exceeded. Rapid incremental decreases in power act to quickly maintain drawn power below the adapter rating while more gradual incremental increases in power prevent a noticeable oscillation when the power draw feedback loop attempts to reach a steady state power draw value.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system manages component operations to maintain power drawn from an external power adapter below a power rating of the external adapter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
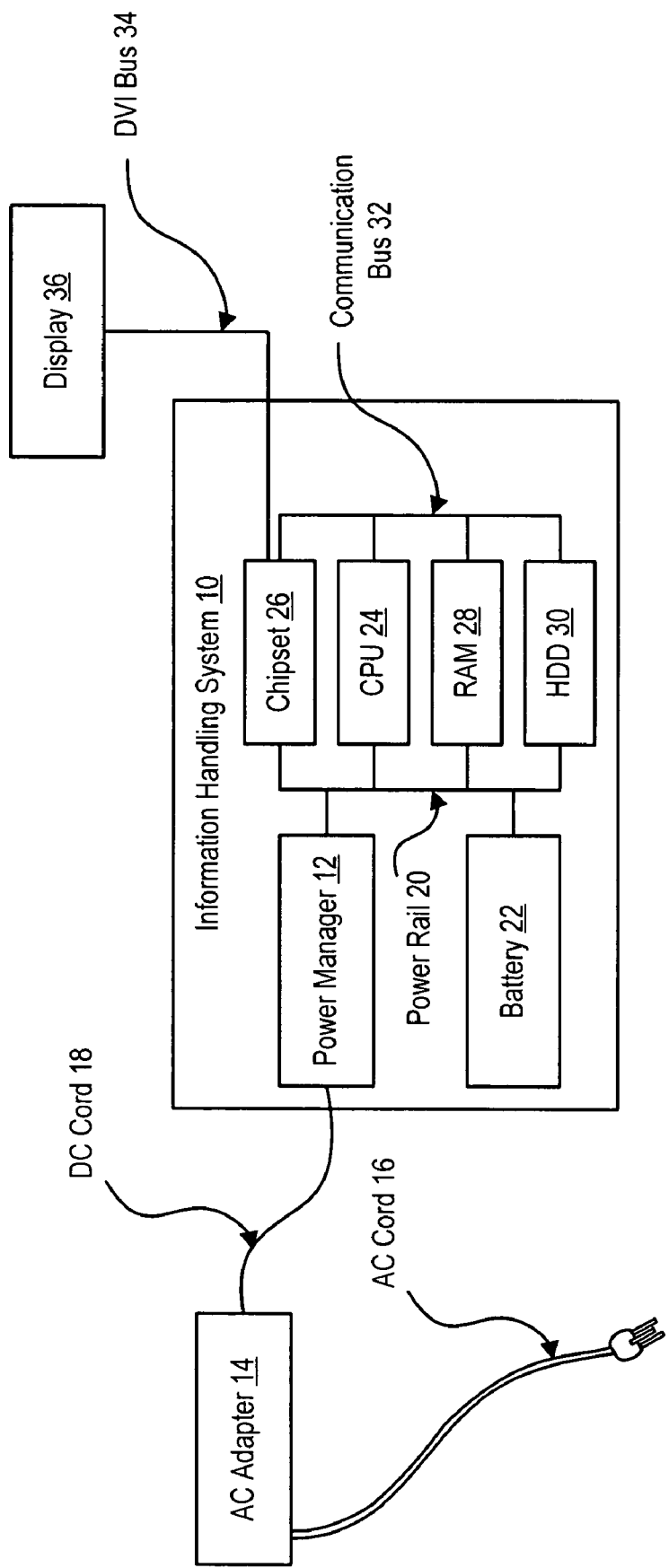
FIG. 1 depicts a block diagram of an information handling system having a power manager to limit power drawn from an external power adapter to below the power rating of the external power adapter.

Referring now to FIG. 1, a block diagram depicts an information handling system 10 having a power manager 12 to limit power drawn from an external power adapter 14 to below the power rating of the external power adapter. External power adapter 14 receives AC power from an AC cord 16 and converts the AC power to DC power that is provided to power manager 12 through a DC cord 18. Power manager 12 provides the DC power to a power rail 20 which charges an internal battery 22 and powers processing components, such as a central processing unit 24, a chipset 26, RAM 28 and a hard disk drive 30. The processing components cooperate through a communication bus 32 to process information, such as for communication through a DVI bus 34 for presentation at a display 36. External adapter 14 has a power rating that defines the maximum power that adapter 14 should provide to information handling system 10, such as 60 or 90 Watts. Power manager 12 monitors the power provided by adapter 14 and alters the operation of information handling system 10 if the power provided by adapter 14 falls within a limit of the rated power. For instance, power manager 14 limits recharging of battery 22 and, if the power drawn stills falls within the limit, power manager 14 alters the operation of the processing components to maintain power drawn from adapter 14 below the maximum rating. Initially, the processing component operation is altered by ordering a battery optimized mode that is normally used to preserve power when operating on battery 22. If the power drawn remains within the limit under the battery optimized mode, power manager 12 throttles CPU 24 to further reduce power demand to ensure that the power rating of adapter 12 is not violated. As power drawn by information handling system 10 falls below the limit, the processing components are incrementally returned to normal operations by stepping up the operating speed of CPU 24 from the throttled state and then incrementally removing the battery optimized mode.

Figure 2:
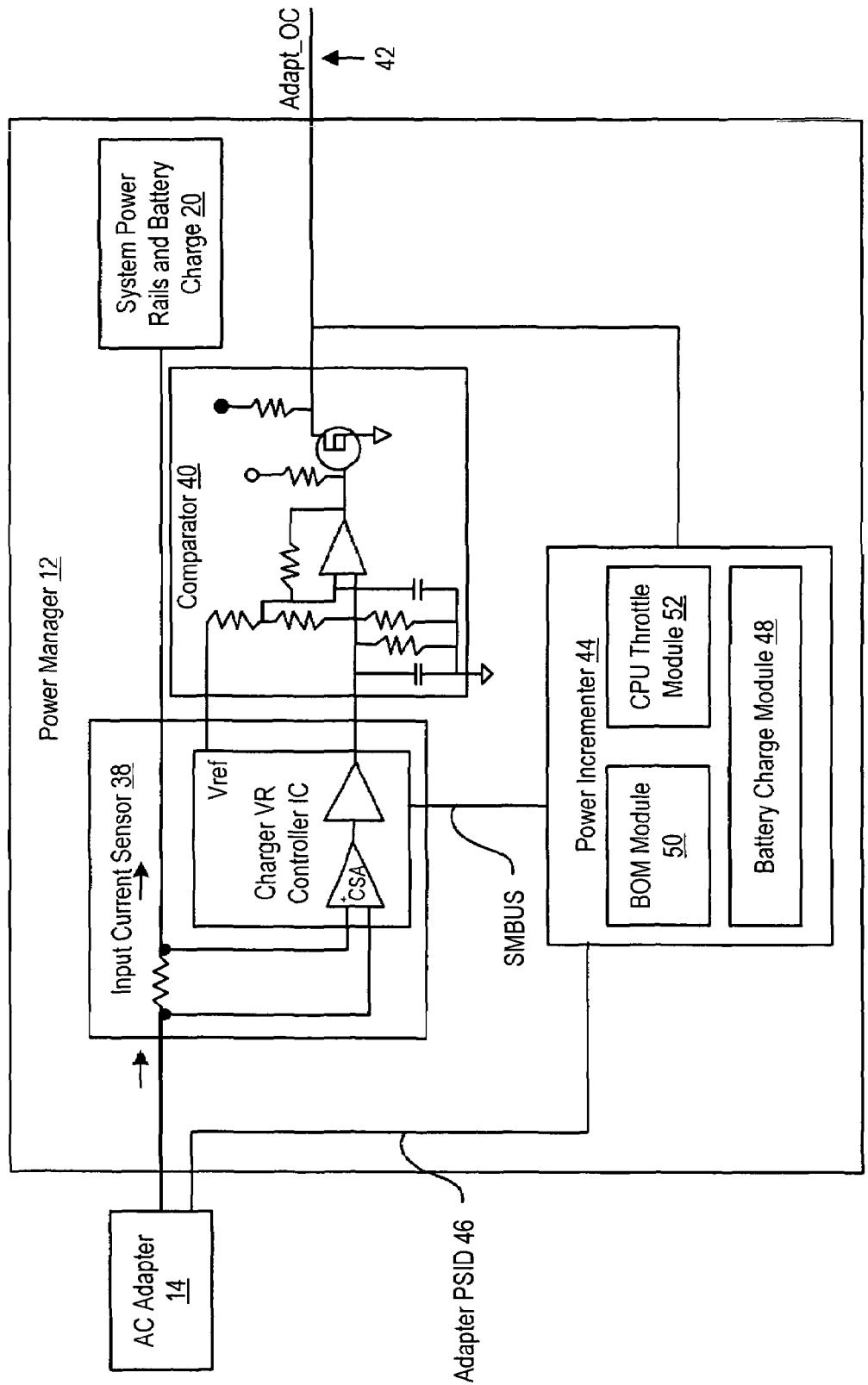
FIG. 2 depicts a block diagram of a power manager that limits power drawn from an external power adapter to below the power rating of the external power adapter.

Referring now to FIG. 2, a block diagram depicts a power manager 12 that limits power drawn from an external power adapter 14 to below the power rating of the external power adapter. An input current sensor 38 determines the current provided from adapter 14 to the system power rail 20 for operating the processing components and charging the battery. The sensed current is communicated to a comparator 40 which compares the sensed current with a limit current associated with a power level that approaches the power rating of adapter 14. If the sensed current approaches to within a range of the limit current, comparator 40 issues a trip signal 42 to a power incrementer 44 to command a reduction in power used by information handling system 10 so that the power demanded by information handling system 10 will not exceed the power rating of adapter 14. The threshold for initiating trip signal 42 is set with sufficient margin to prevent power demands from information handling system 10 that exceed the power rating of adapter 12. Comparator 40 includes hysteresis to reduce noise and provide a more precise limit value with improved utilization of adapter 12.

Power incrementer 44 verifies that adapter 14 has the relevant power rating by reading an identifier from a PSID source 46 and then enforces alterations in the operation of information handling system 10 to avoid power demands in excess of the power rating of adapter 14. As the power used by information handling system 10 is reduced, the current sensed by input current sensor 38 is reduced until comparator 40 determines that the sensed current falls below the limit current and removes trip signal 42. Power incrementer 44 responds to removal of trip signal 42 by increasing the amount of power that information handling system 10 may draw. Comparator 40 applies and removes trip signal 42 at a defined limit current or, alternatively, applies trip signal 42 above a defined limit range and removes trip signal 42 below a defined limit range so that, when current draw falls within the limit range power incrementer 44 does not alter the operations of information handling system 10.

Power incrementer 44 manages power drawn by information handling system 10 by managing power applied to charge battery 22, by managing power applied to run processing components of information handling system 10 and by throttling the speed of CPU 24. Power incrementer 44 selectively increases the amount of power that information handling system 10 is allowed to draw if additional power draw will not exceed the power rating of adapter 12 and decreases the amount of power that information handling system 10 is allowed to draw if sensed power draw approaches the power rating of adapter 12. As the sensed power draw approaches the power rating of adapter 12, a battery charge module 48 first decreases the amount of power used to charge battery 22 until the charge level is minimal. If trip signal 42 continues to indicate an excessive power draw level, a battery optimized mode module 50 commands processing components to enter battery optimized mode steps that decrease power demand. Once the lowest level of power demand available by use of battery optimized mode steps has been achieved, if trip signal 42 continues to indicate and excessive power draw level, then a CPU throttle module 52 commands CPU 24 to enter throttled states to further reduce power draw. If trip signal 42 indicates that additional power draw is available, CPU throttle module 52 eliminates CPU throttling, then battery optimized mode module 50 eliminates use of the battery optimized mode and, finally, battery charge module 48 eliminates restrictions on battery charging. Power incrementer 44 is, for instance, firmware operating in the BIOS of information handling system 10 within chipset 26 that has access to physical component operating states.

Figure 3:
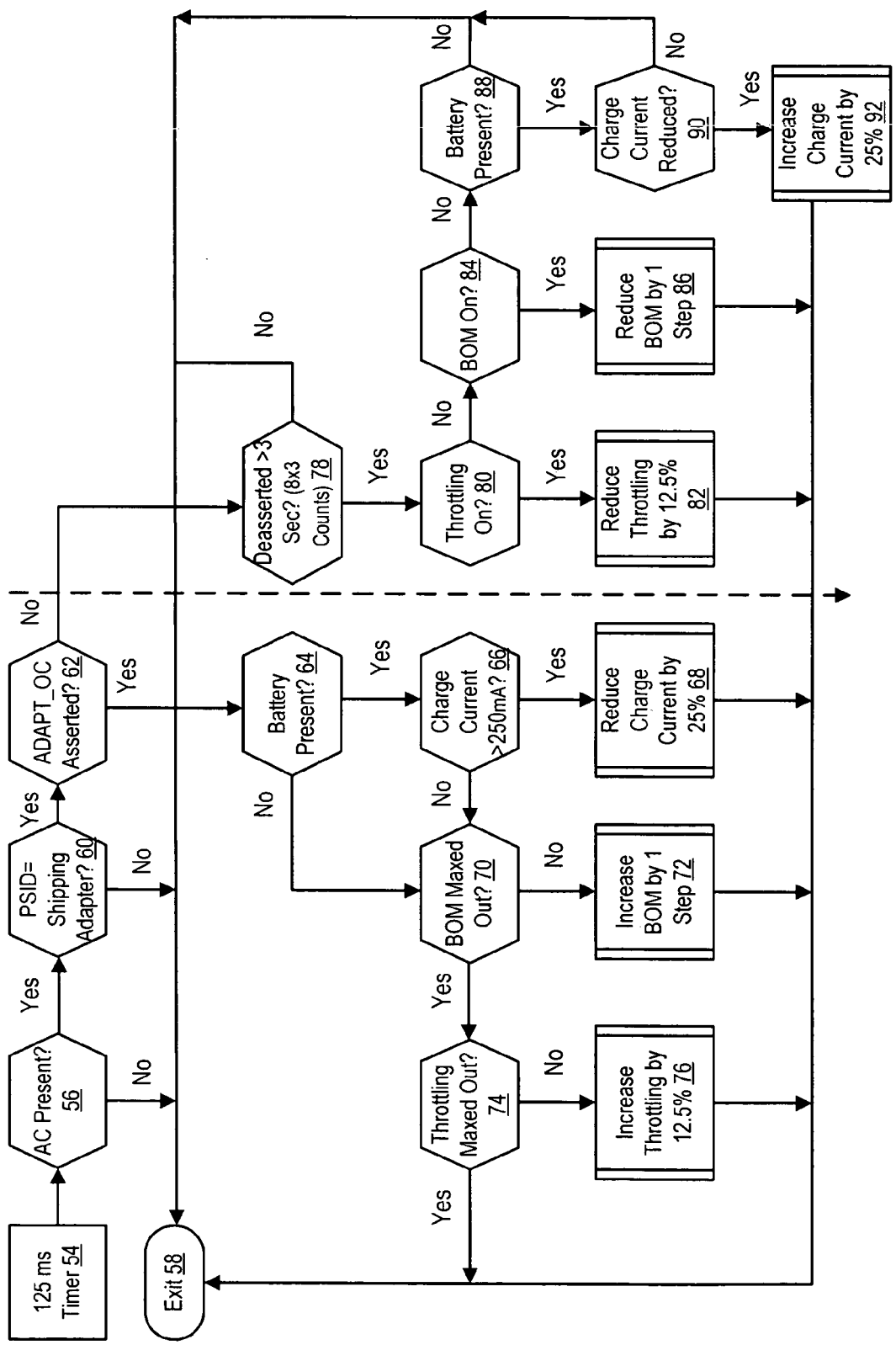
FIG. 3 depicts a flow diagram of a process for limiting power drawn by an information handling system from an external power adapter to below the power rating of the external power adapter.

Referring now to FIG. 3, a flow diagram depicts a process for limiting power drawn by an information handling system from an external power adapter to below the power rating of the external power adapter. The process begins at step 54 at 125 ms intervals and continues to step 56 to determine if AC power is present. If AC power is not present the process ends at step 58 since adapter is not connected. If AC power is present, the process continues to step 60 to determine if a PSID matches the adapter shipped with the information handling system. If the adapter is not recognized, the process ends at steps 58. If the adapter identification is recognized, the process continues to step 62 to determine if a trip signal is present that indicates that power drawn by the information handling system exceeds the limit value that protects against power draws in excess of the adapter power rating. If the trip signal is set indicating that power drawn by the information handling system is above the limit, the process continues to step 64 to reduce power drawn by the information handling system. If the trip signal is not set indicating that power drawn by the information is below the limit, the process continues to step 78 to allow increases in power drawn by the information handling system.

At step 64 a determination is made of whether a battery is present in the information handling system. If a battery is present, a determination is made at step 66 of whether the battery is charging at greater than a minimal value, such as greater than 250 mA. If the battery is charging, the process continues to step 68 to reduce the charge current by 25% and the process ends at step 58. If a battery is not present at step 64 or not charging at a significant current at step 66, the process continues to step 70 to determine if any battery optimized mode steps are available. If a battery optimized mode step is available, the process continues to step 72 to increase the battery optimized mode by one increment, thus reducing processing component power draw, and the process ends at step 58. If at step 70 all battery optimized mode steps have been used, the process continues to step 74 to determine whether central processing unit throttling is available. If throttling is available, the process continues to step 76 to increase throttling by 12.5%. If throttling is not available at step 74, then no additional reductions in power consumption are available and the process ends at step 58. Thus, in summary, in each 125 ms interval in which a trip signal exists, power draw by the information handling system is reduced by one increment unless all possible power reductions have been made.

If at step 62 the trip signal is not set, the process continues to step 78 to determine if the trip signal has been deasserted for at least three seconds. If not, the process ends at step 58. The delay of at least three seconds applied at step 78 ensures that incremental increases in power occur more slowly than incremental decreases, thus avoiding rapid oscillations between various power consumption states. If at step 78 the delay time of three seconds has passed, the process continues to determine if throttling is currently enforced. If so, then at step 80 throttling is reduced by 12.5% to allow increased power consumption by the CPU and the process ends at step 58. If at step 80 throttling is not on, the process continues to step 84 to determine if a battery optimized mode is in use. If a battery optimized mode is in use, the battery optimized mode is reduced by one increment to allow increased power consumption and the process ends at step 58. If at step 84 a battery optimized mode is not in use, the process continues to step 88 to determine if a battery is present. If a battery is not present, the process ends at step 58. If a battery is present, a determination is made at step 90 of whether a reduced charge current is applied to battery. If the battery is being charged at a reduced charge, the process continues to step 92 to increase the battery charge current by 25% and the process ends at step 58. If at step 90 the battery charge rate is not reduced, then the process ends at step 58.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis;
   plural processing components disposed in the chassis and operable to process information;
   a battery disposed in the chassis and operable to power the processing components;
   a power adapter external to the chassis and operable to interface with and power the processing components and to interface with and charge the battery, the power adapter having a predetermined power rating; and
   a power manger interfaced with the processing components, the battery and the power adapter, the power manager operable to detect that power drawn by the processing components approaches the power adapter power rating, the power manager further operable to manage operation of the processing components to maintain power drawn by the processing components at less than the power adapter rating;
   wherein the processing components have a battery optimized mode of operating, the battery optimized mode reducing power consumption of the processing components while operating on power provided by the battery, the power manager further operable to manage operation of the processing components to maintain power drawn by the processing components at less than the power adapter rating by selectively commanding the battery optimized mode.

2. The information handling system of claim 1, wherein the battery optimized mode comprises plural steps of reduced power consumption, the power manager managing operation of the processing components by incrementally selecting battery optimized mode steps to maintain power drawn by the processing components at less than the power adapter rating.

3. The information handling system of claim 2, wherein the power manager increments the battery optimized mode steps to reduce power drawn by the processing components in a first time increment having a first length and increments the battery optimized mode steps to increase power drawn by the processing components in a second time increment having a second length, the second length substantially longer than the first length.

4. The information handling system of claim 1, wherein the processing components comprises a central processing unit, the central processing unit having plural throttled modes of operation, the throttled modes having reduced power consumption, the power manager further operable to manage operation of the central processing unit to maintain power drawn by the processing components at less than the power adapter rating by selectively commanding the throttling.

5. The information handling system of claim 4, wherein the power manager increments the central processing unit throttled modes of operation to reduce power drawn by the processing components in a first time increment having a first length and increments the central processing unit throttled modes of operation to increase power drawn by the processing components in a second time increment having a second length, the second length substantially longer than the first length.

6. The information handling system of claim 1, wherein the power manager manages operation of the processing components to maintain power drawn by the processing components at less than the power adapter rating by first reducing power applied from the adapter for charging the battery, second reducing power drawn by the processing components by command of one or more battery optimized modes of operation for the processing components, and third reducing power drawn by the processing components by command of throttling of a central processing unit.

7. A method for managing power drawn by an information handling system from an external power adapter having a power rating, the method comprising:
    detecting that power drawn by the information handling system falls within a predetermined limit of the power rating;
    incrementally reducing power drawn by the information handling system to charge a battery; and
    incrementally reducing power drawn by one or more processing components to maintain power drawn by the information handling system at less than the power adapter power rating.

8. The method of claim 7, further comprising:
    detecting that power drawn by the information handling system falls out of the predetermined limit of the power rating; and
    incrementally increasing the power drawn by the one or more processing components to maintain power drawn by the information handling system at less than the power adapter rating.

9. The method of claim 8, wherein incrementally increasing the power drawn by the one or more processing components further comprises asserting a predetermined delay between each incremental increase of the power drawn.

10. The method of claim 9, wherein the predetermined delay comprises approximately three seconds.

11. The method of claim 7, wherein incrementally reducing power drawn by one or more processing components further comprises incrementally imposing a battery optimized mode step.

12. The method of claim 7, wherein incrementally reducing power drawn by one or more processing components further comprises throttling a central processing unit.

13. The method of claim 7, further comprising:
    communicating identification information from the power adapter to the power adapter to the information handling system;
    failing to recognize the identification information at the information handling system; and
    selecting a reduced power adapter power rating for use at the information handling system.

14. A system for managing power drawn by an information handling system from an external power adapter, the system comprising:
    an input current sensor operable detect current drawn from the adapter;
    a comparator interfaced with the input current sensor, the comparator operable to compare the current drawn from the adapter with a maximum current and to issue a trip signal if the current drawn from the adapter falls within a predetermined limit of the maximum current; and
    a power incrementer interfaced with the comparator, the power incrementer operable to incrementally alter the operation of one or more processing components of the information handling system in response to the trip signal, the altering of the operation of the one or more processing components to reduce power consumed by the one or more processing components so that the current drawn from the adapter remains below the maximum current.

15. The system of claim 14, wherein the power incrementer comprises a battery optimized mode module operable to incrementally enforce battery optimized mode step reductions in power consumption in response to the trip signal.

16. The system of claim 14, wherein the power incrementer comprises a central processing unit throttle module operable to incrementally throttle the central processing unit in step reductions of performance in response to the trip signal.

17. The system of claim 14, wherein the power incrementer comprises a battery charge module operable to substantially eliminate charging of a battery associated with the information handling system before the altering of the operation of the one or more processing components in response to the trip signal.

18. The system of claim 14, wherein the power incrementer is further operable to alter the operation of one or more processing components of the information handling system in response to absence of the trip signal, the altering of the operation of the one or more processing components to incrementally increase power consumed by the one or more processing components.

19. The system of claim 18, wherein the power incrementer is further operable to enforce a predetermined delay before altering the operation of the one or more processing components to incrementally increase power.

* * * * *